(12) United States Patent
Shimouchi

(10) Patent No.: US 10,290,910 B2
(45) Date of Patent: May 14, 2019

(54) BATTERY PACK FOR A VEHICLE

(71) Applicant: TOYOTA JIDOSHA KABUSHIKI KAISHA, Toyota-shi, Aichi-ken (JP)

(72) Inventor: Wataru Shimouchi, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 669 days.

(21) Appl. No.: 14/953,966

(22) Filed: Nov. 30, 2015

(65) Prior Publication Data
US 2016/0156077 A1 Jun. 2, 2016

(30) Foreign Application Priority Data
Dec. 1, 2014 (JP) .................................. 2014-243105

(51) Int. Cl.

| | |
|---|---|
| H01M 10/00 | (2006.01) |
| H01M 10/6557 | (2014.01) |
| H01M 10/613 | (2014.01) |
| H01M 10/625 | (2014.01) |
| H01M 2/10 | (2006.01) |
| B60L 3/00 | (2019.01) |
| B60L 11/18 | (2006.01) |
| H01M 2/12 | (2006.01) |
| H01M 10/647 | (2014.01) |
| H01M 10/6561 | (2014.01) |

(52) U.S. Cl.
CPC ....... *H01M 10/6557* (2015.04); *B60L 3/0061* (2013.01); *B60L 11/1864* (2013.01); *B60L 11/1874* (2013.01); *B60L 11/1877* (2013.01); *B60L 11/1879* (2013.01); *H01M 2/1077* (2013.01); *H01M 10/613* (2015.04); *H01M 10/625* (2015.04); *B60L 2240/545* (2013.01); *H01M 2/12* (2013.01); *H01M 10/647* (2015.04); *H01M 10/6561* (2015.04); *H01M 2220/20* (2013.01); *Y02T 10/7011* (2013.01); *Y02T 10/7061* (2013.01)

(58) Field of Classification Search
CPC ......... H01M 10/65578; H01M 10/613; H01M 10/625; H01M 2220/20
See application file for complete search history.

(56) References Cited

U.S. PATENT DOCUMENTS

| | | | |
|---|---|---|---|
| 2013/0149583 A1* | 6/2013 | Kurita ................. | H01M 2/1077 429/120 |
| 2015/0228947 A1 | 8/2015 | Nagamine et al. | |

FOREIGN PATENT DOCUMENTS

| | | |
|---|---|---|
| JP | 56-143919 U | 3/1980 |
| JP | 01-146458 U1 | 10/1989 |
| JP | 2007109546 A | 4/2007 |

(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

A battery pack for a vehicle includes a first dell stack and a second cell stack. The first cell stack includes a plurality of cells and a first exhaust surface. The first exhaust surface has a first exhaust port from which refrigerant is discharged. The second cell stack includes a plurality of cells and a second exhaust surface. The second exhaust surface has a second exhaust port from which refrigerant is discharged. The first exhaust surface and the second exhaust surface are opposed each other, and at least part of the first exhaust port does not face the second exhaust port.

5 Claims, 7 Drawing Sheets

(56) References Cited

FOREIGN PATENT DOCUMENTS

| JP | 2014-110190 A | 6/2014 |
| JP | 2014-130780 A | 7/2014 |
| JP | 2014-135237 A | 7/2014 |

* cited by examiner

BATTERY PACK FOR A VEHICLE

CROSS-REFERENCE TO RELATED APPLICATIONS

This application claims priority from Japanese Patent Application No. 2014-243105, filed on Dec. 1, 2014, the disclosure of which is incorporated herein by reference in its entirety.

BACKGROUND OF THE INVENTION

1. Field of the Invention

The present disclosure relates to a battery pack provided in a vehicle.

2. Description of Related Art

A hybrid vehicle, an electric vehicle, and the like is provided with a battery pack as a battery for driving a rotary electric machine and for accumulating electric power generated by the rotary electric machine or electric power charged from external power. It is known to configure a battery pack such that two or more cell stacks are placed in one battery outer case. Further, each of the cell stacks may be configured such that battery cells and resin frames provided with a refrigerant passage are laminated alternately and then restricted by a restraint member. A configuration of such a battery pack is disclosed in Japanese Patent Application Publication No. 2014-135237 (JP 2014-135237 A), for example.

Here, each of the battery cells generates heat along with charging and discharging. Excessive heat generation can cause the temperatures of the battery cells to increase, which may decrease the performance and life of the battery cells. In view of this, it has been proposed that each battery cell is cooled down by using, as refrigerant, air taken in from outside a battery pack. For example, resin frames in a cell stack are each provided with a passage for guiding the refrigerant between the battery cells. The refrigerant guided between the battery cells is discharged outside the cell stack after heat exchange is performed between the refrigerant and the battery cells. Accordingly, each of the cell stacks includes an intake port and an exhaust port for the refrigerant.

Two or more cell stacks may be accommodated in a battery outer case for a battery pack. In this case, respective exhaust ports of adjacent cell stacks face each other, so that exhaust gases therefrom might interfere with each other. The heated exhaust gases, that is, hot blasts interfere with each other, so that the hot blasts remain around the cell stacks for a long time. As a result, the cell stack receives thermal influence from its adjacent cell stack, which may cause a decrease in cooling efficiency, and eventually, a decrease in durability and performance. One conceivable solution would be to increase the distance between adjacent cell stacks. However, increasing the distance between adjacent cell stacks might increase the size of the battery pack.

SUMMARY OF THE INVENTION

In view of this, the present disclosure provides a battery pack excellent in space efficiency without decreasing cooling efficiency.

A battery pack related to the present disclosure is for a vehicle. The battery pack includes a first cell stack and a second cell stack. The first cell stack includes a plurality of cells and a first exhaust surface. The first exhaust surface has a first exhaust port from which refrigerant is discharged. The second cell stack includes a plurality of cells and a second exhaust surface. The second exhaust surface has a second exhaust port from which refrigerant is discharged. The first exhaust surface and the second exhaust surface are opposed each other, and at least part of the first exhaust port does not face the second exhaust port.

According to the battery pack, the first exhaust surface and the second exhaust surface are opposed to each other, but at least part of the first exhaust port does not face the second exhaust port. This accordingly makes it possible to prevent interference between an exhaust gas from the first cell stack and an exhaust gas from the second cell stack effectively, thereby making it possible to prevent poor cooling efficiency of the battery pack. Further, according to the battery pack, a distance between the first cell stack and the second cell stack can be narrowed. Hereby, according to the battery pack, it is possible to increase space efficiency without decreasing cooling efficiency.

A battery pack for a vehicle may include a first cell stack having opposing top and bottom surfaces and opposing first and second exhaust surfaces; and a second cell stack having opposing top and bottom surfaces and opposing third and fourth exhaust surfaces, the first and second cell stacks in a fixed configuration, wherein each of the bottom surfaces of the first and second cell stacks comprises an intake port configured to receive a refrigerant, each of the exhaust surfaces of the first and second cell stacks comprises an exhaust port configured to discharge a refrigerant, each of the first and second cell stacks comprises a plurality of battery cells and a plurality of frames in an alternating configuration, the frames comprising a refrigerant passage configured to connect one of the intake ports with a corresponding exhaust port, the second exhaust surface of the first cell stack faces the third exhaust surface of the second cell stack, and the exhaust port on the second exhaust surface is offset in a direction parallel to the second exhaust surface with respect to the exhaust port on the third surface.

The first and second cell stacks may be surrounded by a battery outer case.

The battery pack may further include a refrigerant duct located in between the bottom surfaces of the first and second cell stacks and the battery outer case.

The battery outer case may be configured such that air from outside the battery outer case is drawn into the battery outer case.

The first and second cell stacks may further comprise paired leg portions extending from a bottom part of the frames.

A region surrounded by the paired leg portions, the bottom surfaces of the first and second cell stacks, and a bottom face of the battery outer case may define a refrigerant duct.

The battery pack may be configured such that air is guided into the refrigerant duct from an external area outside the battery outer case.

The refrigerant passage may be configured such that heat exchange is performed between the air and the battery pack when air is drawn into the refrigerant passage.

The exhaust ports may be configured such that refrigerant is discharged outside the cell stack from the exhaust ports.

The battery cells may comprise a nickel-cadmium battery, a nickel-metal hydride battery, or a lithium-ion battery.

The frames may comprise resin frames made from an insulating material.

The first cell stack and the second cell stack may be in a fixed position with respect to the battery outer case.

The first cell stack may be offset in a direction parallel to the second exhaust surface with respect to the second cell stack.

The battery outer case may be configured to accommodate the offset position of the first cell stack with respect to the second cell stack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
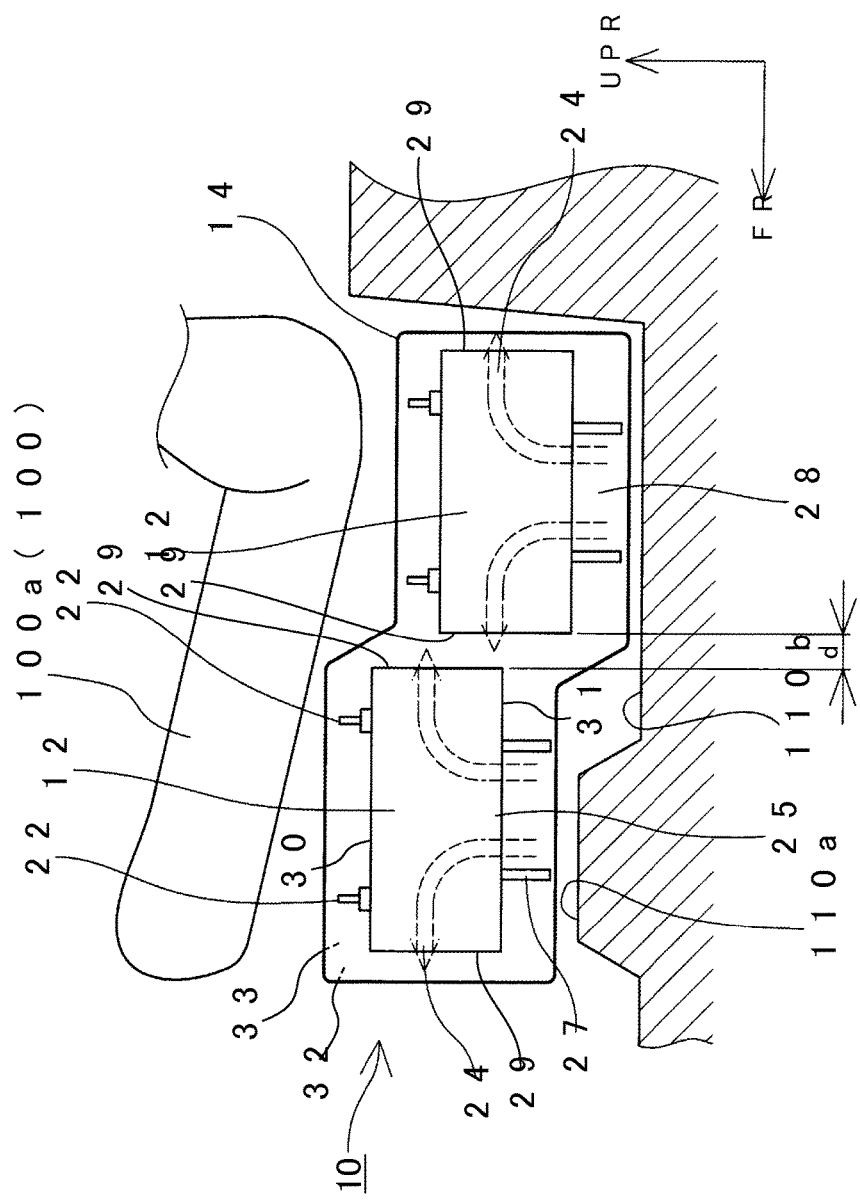
FIG. 1 is a view illustrating an exemplary mounting state of a battery pack according to an embodiment of the present disclosure.
Figure 2:
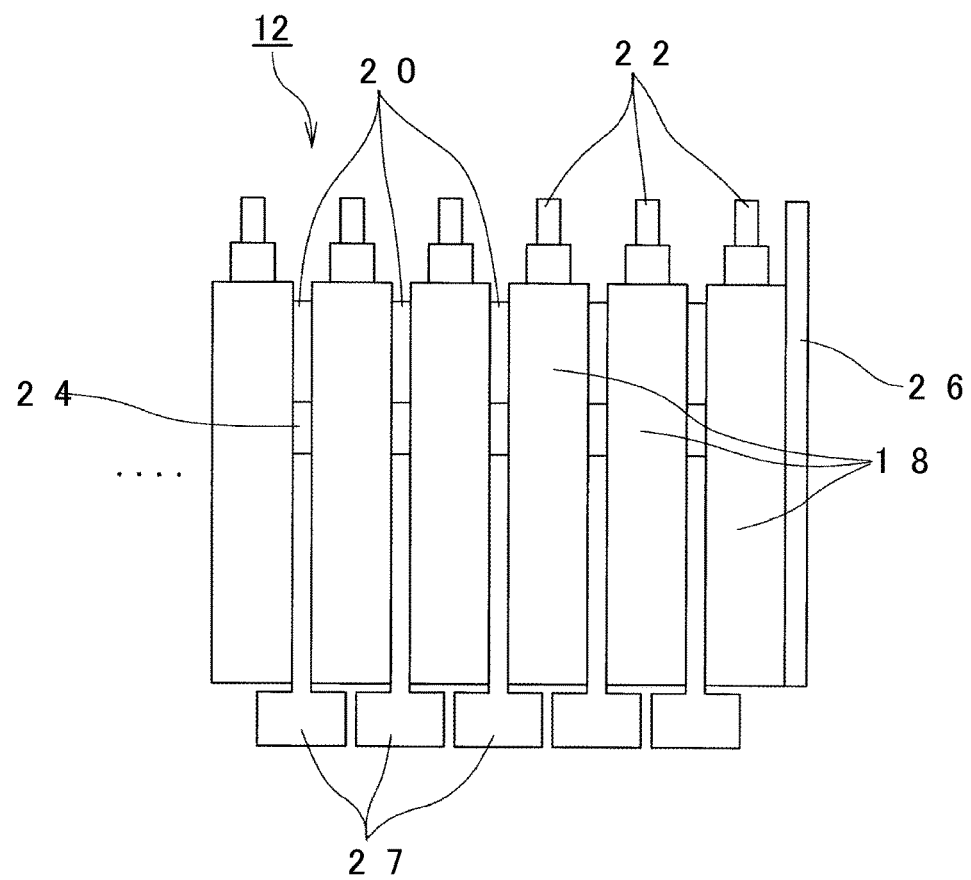
FIG. 2 is a view illustrating an exemplary schematic configuration of a cell stack.

An embodiment will now be described with reference to FIGS. 1 and 2. A battery pack 10 is an in-vehicle secondary battery to be provided in an electrically driven vehicle such as a hybrid vehicle or an electric vehicle. The battery pack 10 is configured to supply electric power to a rotary electric machine provided in the vehicle and to accumulate electric power generated by the rotary electric machine and electric power supplied from an external power supply. The battery pack 10 includes a plurality of cell stacks 12, and a battery outer case 14 for accommodating the plurality of cell stacks 12 therein. In the present embodiment, two cell stacks 12 (a first cell stack and a second cell stack) are accommodated in one battery outer case 14.

Each of the cell stacks 12 is configured such that a plurality of battery cells 18 and a plurality of resin frames 20 are laminated alternately, and further, end plates 26 are placed at a lamination starting end and at a lamination terminal end. A laminated body constituted by the battery cells 18, the resin frames 20, and the end plates 26 is restricted by a restraint tool (not shown) in a compressed state in a laminating direction.

The battery cell 18 is a secondary battery that is chargeable and dischargeable, e.g., a nickel-cadmium battery, a nickel-metal hydride battery, a lithium-ion battery, and the like. The battery cells 18 each include two electrode terminals 22, namely, a positive terminal and a negative terminal, which are provided at an interval in a width direction of the battery cell 18. By connecting the positive terminal of the battery cell 18 to a negative terminal of its adjacent battery cell 18, the plurality of battery cells 18 are connected in series to each other. In the following description, a formation surface of the electrode terminals 22 is referred to as an "upper face 30" and a surface opposite to the upper face is referred to as a "bottom face 31." The cell stacks 12 each have an upper face 30, a bottom face 31, a front face 32, a back face 33, and paired side faces 29. The front face 32 and the back face 33 are both end surfaces in a laminating direction of the battery cells 18. The paired side faces 29 are both end surfaces in a cell width direction.

The resin frame 20 is made of an insulation material such as resin and is disposed between adjacent battery cells 18. At least one of a front surface and a back surface of the resin frame 20 is provided with a passage of refrigerant for cooling down each of the battery cells 18, that is, a refrigerant passage. In the present embodiment, air taken in from a passenger compartment is used as the refrigerant. The shape or the like of the refrigerant passage is not limited to a particular configuration. However, in the present embodiment, the refrigerant passage is configured such that the refrigerant entering from the bottom face 31 of the cell stack 12 flows out through the side face 29. In other words, in the cell stack 12 of the present embodiment, an intake port 25 for taking the refrigerant therein is formed on the bottom face 31, and an exhaust port 24 for exhausting the refrigerant is formed on the side face 29. Note that, in the following description, a surface (the side face 29) where the exhaust port 24 is formed is referred to as an "exhaust surface 29" as needed.

Paired leg portions 27 extend from a bottom part of the resin frame 20. A region surrounded by the paired leg portions 27, the bottom face of the cell stack 12, and a bottom face of the battery outer case 14 serves as a refrigerant duct 28 through which the refrigerant flows. Note that the configuration of the refrigerant duct 28 shown in FIG. 1 is an example, and is not limited thereto. The refrigerant duct 28 may employ other configurations, provided that the refrigerant can be guided to each of a plurality of intake ports 25 formed on the bottom face 31 of the cell stack 12. In the present embodiment, the refrigerant duct 28 is formed by use of part of the resin frame 20, but the refrigerant duct 28 may be constituted by use of a member completely separated from the resin frame 20. Thus, the refrigerant (air) is guided to the refrigerant duct 28 from an external part (the passenger compartment) outside the battery outer case 14 and flows between the battery cells 18 from the intake ports 25 formed on the bottom face 31 of the cell stack 12, and heat exchange is performed between the refrigerant and the battery cells 18. After that, the refrigerant is discharged outside the cell stack 12 from the exhaust ports 24 formed on the side faces 29 of the cell stack 12. The exhaust gas thus discharged outside the cell stack 12 from exhaust port 24 is further discharged outside the battery outer case 14 from an outlet opening (not shown) provided in the battery outer case 14.

In the meantime, in the present embodiment, two cell stacks 12 are accommodated in one battery outer case 14, as has been already described. Each of the cell stacks 12 is placed such that its upper face 30 faces a vehicle upper direction and the laminating direction of the battery cells 18 is parallel to a vehicle width direction (a vertical direction to a plane of paper of FIG. 1). Note that to be "parallel" is naturally not limited to a case of being completely parallel, but also includes a case of being "generally parallel" which includes acceptable deviation. Further, the two cell stacks 12 are arranged adjacent to each other in a vehicle front-rear direction so that their side faces 29, i.e., their exhaust surfaces 29, are opposed to each other. Note that, in the present embodiment, the two cell stacks 12 are placed so as to be shifted in a direction parallel to their exhaust surfaces 29, more specifically, a vehicle height direction, as illustrated in FIG. 1. In other words, mounting heights of the two cell stacks 12 are different from each other. As a result, respective exhaust ports 24 provided on respective side faces 29 of the two cell stacks 12 do not face each other, but are shifted from each other in the height direction.

In the present embodiment, the battery pack 10 is provided below a seat, e.g., a rear seat 100. At this time, it is desirable that the battery pack 10 be as small as possible so as to secure a space in which to place the feet of an occupant, or the like. Further, it is desirable that a seating face 100a of the seat such as the rear seat 100 be lowered as it approaches a rear side, so as to secure comfortability of the occupant. It is desirable that the battery pack 10 be placed without obstructing the arrangement of the seating face 100a. Further, a cross member is placed below the rear seat 100. The cross member is a reinforcing member provided so as to raise strength/rigidity of a vehicle body and to extend in a vehicle-body width direction (the vertical direction to the plane of paper in FIG. 1). A floor surface below the seat has a step because such a cross member is provided therein. It is desirable that the battery pack 10 be able to use a space effectively even if such a step is provided on the floor surface.

In the present embodiment, the two cell stacks 12 are placed so that their respective exhaust ports 24 do not face each other, but are shifted in the height direction as has been already described. By shifting the respective exhaust ports 24 of the two cell stacks 12 from each other, exhaust gases discharged from the respective exhaust ports 24 do not interfere with each other. As a result, the exhaust gases are hard to be accumulated around the cell stacks 12, and the exhaust gases flow through outlet openings quickly so as to be discharged outside the battery outer case 14. The exhaust gases are heated due to heat exchange with the battery cells 18. However, since the exhaust gases thus heated do not accumulate around the cell stacks 12, the thermal influence between the cell stacks 12 can be decreased. In this case, even if an adjacent distance d between the cell stacks 12 is made small, it is possible to obtain a sufficient cooling effect, thereby making it possible to reduce the adjacent distance d between the cell stacks 12, eventually, to reduce a size of the battery pack 10.

Further, in the present embodiment, in order to shift the exhaust ports 24 from each other, a mounting height of the cell stack 12 placed on a vehicle rear side is set to be lower than a mounting height of the cell stack 12 placed on a vehicle front side. In a sense, the two cell stacks 12 are placed so as to descend backward, similarly to the seating face 100a of the seat. As a result, it is possible to effectively prevent interference between the battery pack 10 and the seating face 100a of the seat, thereby making it possible to achieve an improvement in comfortability of the occupant, a reduction in a vehicle height, and the like. That is, in a case where the two cell stacks 12 are placed at the same placement height, the cell stack 12 on the vehicle front side might interfere with the seating face 100a of the seat. In order to place the seating face 100a so as to descend backward while avoiding such interference, the seating face 100a of the seat may be thinned as it approaches a rear side. However, in this case, the comfortability of the occupant is impaired greatly. Further, when the seating face 100a (eventually, a placement height of the seat) is set to be high, it is also possible to avoid interference between the battery pack 10 and the seating face 100a. However, in this case, unless a ceiling of the passenger compartment is also made high, a confined feeling increases, which impairs the comfortability of the occupant. However, if the ceiling of the passenger compartment is made high, the vehicle size and the vehicle weight are increased, thereby causing poor fuel efficiency. In the meantime, as described in the present embodiment, by placing the battery pack 10 so as to descend backward in accordance with the seating face 100a, it is possible to effectively prevent interference between the battery pack 10 and the seating face 100a, and to secure the comfortability of the occupant. Besides, it is possible to prevent poor fuel efficiency.

Further, since the cross member is provided on a floor surface below the seat, there is a first surface 110a that is higher than its periphery and a second surface 110b placed on a vehicle rear side relative to the first surface 110a so as to be lower than the first surface 110a. In the present embodiment, the cell stack 12 on the vehicle front side which is placed on the first surface 110a is provided at a position higher than the cell stack 12 on the vehicle rear side which is placed on the second surface 110b. As a result, the bottom face of the battery pack 10 has a step, similarly to a vehicle floor surface. Even if such a battery pack 10 is provided over the step on the floor surface, dead space is reduced, which increases space efficiency.

That is, according to the present embodiment, by shifting respective heights of the exhaust ports 24 of the two cell stacks 12 from each other, it is possible to reduce the adjacent distance d between the cell stacks 12, and eventually, to reduce a front-rear width of the battery pack 10. Further, by shifting respective mounting heights of the two cell stacks 12 from each other, it is possible to increase space efficiency, to effectively prevent size-up of the vehicle, and also to secure a thickness of the seating face 100a of the seat, thereby making it possible to secure the comfortability of the occupant.

Note that the configuration described so far is an example, and the two cell stacks 12 may have other configurations, provided that respective exhaust surfaces of the two cell stacks 12 are opposed to each other, but at least part of the exhaust port 24 of one of the two cell stacks 12 does not face the exhaust port of the other one of the two cell stacks 12. For example, in the present embodiment, the battery pack 10 is placed below the rear seat 100, but the battery pack 10 may be placed on other locations in an internal space of the vehicle.

For example, the battery pack 10 may be provided below a front seat, instead of the rear seat 100. A seating face 100a of the front seat is also placed so as to descend backward, and a step due to a floor cross member is provided below the front seat. Accordingly, even in this case, a plurality of cell stacks 12 may be placed so that a mounting height of the cell stack 12 on a rear side is lower than a mounting height of the cell stack 12 on a front side such that respective exhaust ports 24 of the plurality of cell stacks 12 do not face each other.

Figure 3:
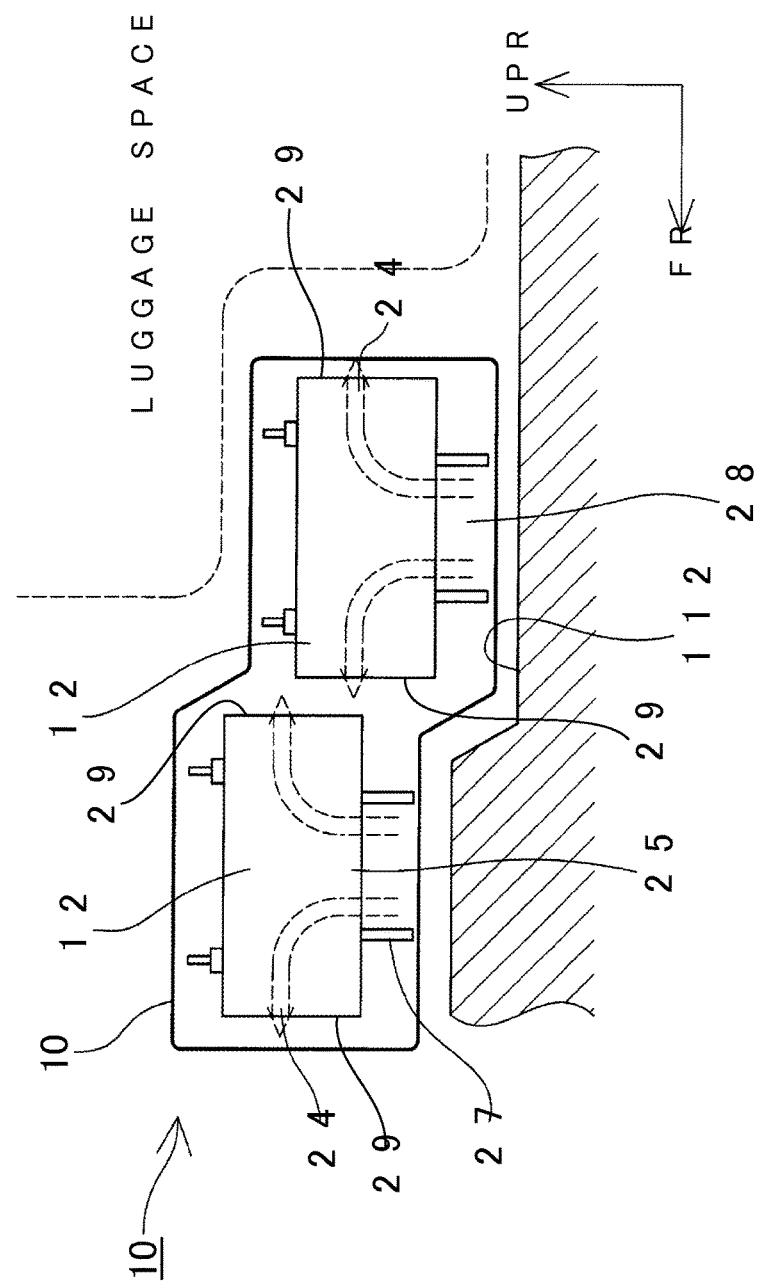
FIG. 3 is a view illustrating an exemplary mounting state of a battery pack.

Further, the battery pack 10 may be placed in a luggage space, instead of being placed below a seat. FIG. 3 is a view illustrating a state where the battery pack 10 is placed in the luggage space. A recessed portion (a spare-tire portion 112) in which to accommodate a spare tire is formed in the luggage space, and one of the cell stacks 12 may be placed in the spare-tire portion 112. Even in this case, a plurality of cell stacks 12 is placed so that a mounting height of the cell stack 12 on a rear side is lower than a mounting height of the cell stack 12 on a front side such that respective exhaust ports 24 of the plurality of cell stacks 12 do not face each other. Hereby, a dead space can be reduced, and a wide luggage space can be secured.

Figure 4:
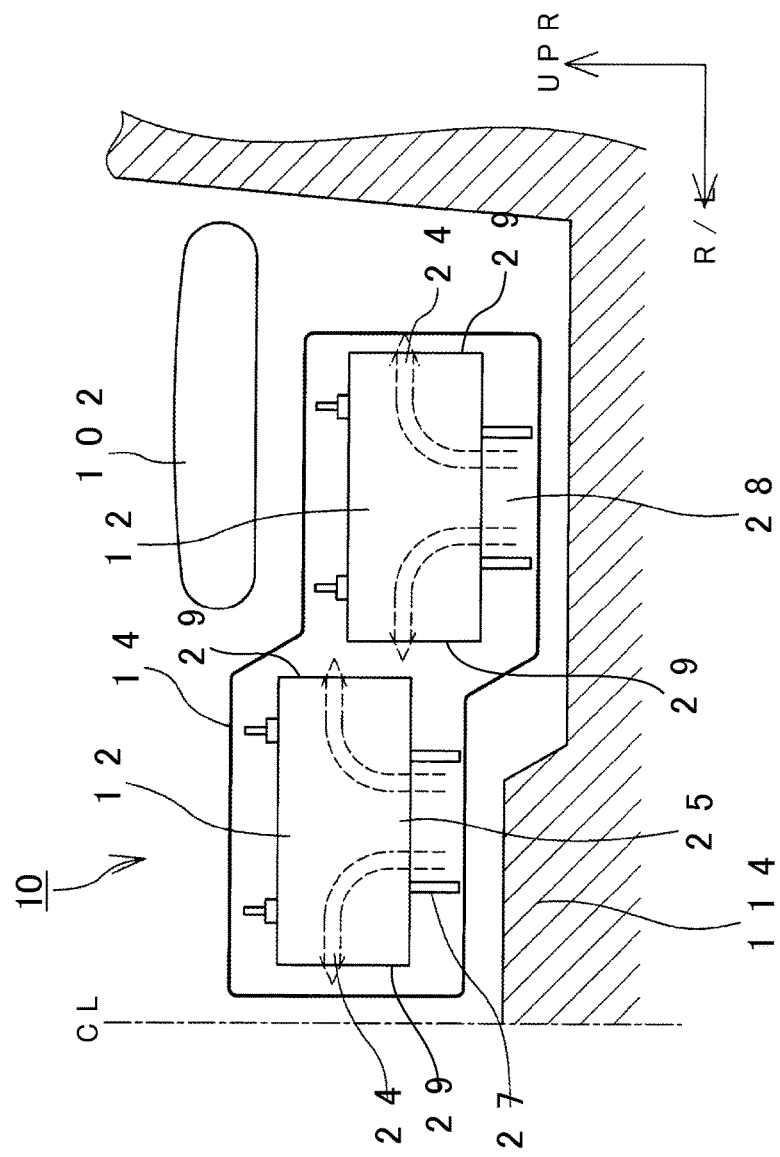
FIG. 4 is a view illustrating an exemplary mounting state of a battery pack.

Further, the above description provides an example in which the laminating direction of the battery cells 18 is parallel to the vehicle width direction. However, a placement orientation of the battery pack 10 may be changed appropriately according to a state of a mounting space. For example, a floor tunnel, which is a large tunnel-shaped reinforcing member extending in the vehicle front-rear direction, is placed in a width-direction central part in a front part of the passenger compartment (between two front seats arranged in the vehicle width direction). The battery pack 10 may be provided around the floor tunnel. FIG. 4 is a view illustrating a state where the battery pack 10 is placed around a floor tunnel 114. Note that, in FIG. 4, an alternate long and short dash line CL indicates a center in the vehicle width direction. In this case, the laminating direction of the battery cells 18 is generally parallel to the vehicle front-rear direction. Further, two cell stacks 12 are accommodated in the battery pack 10, and one of the cell stacks 12 is placed on the floor tunnel 114, and the other one of the cell stacks 12 is placed below a front seat 102. At this time, mounting heights of the two cell stacks 12 are shifted from each other according to a step caused due to the floor tunnel 114. Hereby, dead space can be reduced and space efficiency can be increased. Further, respective exhaust ports 24 of the two cell stacks 12 are placed so as not to face each other, thereby making it possible to increase cooling efficiency of the battery cells 18, and eventually, to reduce the size of the battery pack 10 itself.

Figure 5:
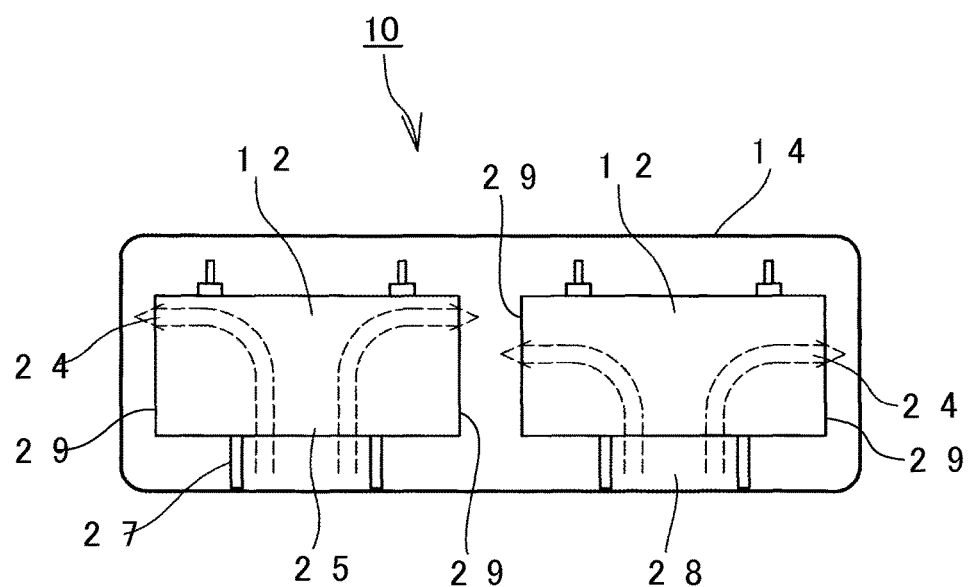
FIG. 5 is a view illustrating an exemplary mounting state of a battery pack.

Further, in the above description, the heights of the exhaust ports 24 are shifted from each other by shifting the mounting heights of the cell stacks 12 themselves. However, if the exhaust ports 24 do not face each other with the exhaust surfaces being opposed to each other, the mounting heights of the cell stacks 12 may be set to the same height. For example, as illustrated in FIG. 5, the cell stacks 12 may have different formation positions of their respective exhaust ports 24. That is, one of the cell stacks 12 may be configured such that an exhaust port 24 is formed near an upper face 30, and the other one of the cell stacks 12 may be configured such that an exhaust port 24 is formed in the vicinity of a center in a height direction. In this case, even if the two cell stacks 12 are placed at the same placement height, the exhaust ports 24 do not face each other. On that account, interaction between the exhaust gases from the exhaust ports 24 is reduced, thereby making it possible to improve cooling efficiency, and eventually, to reduce the distance between the cell stacks 12.

Figure 6:
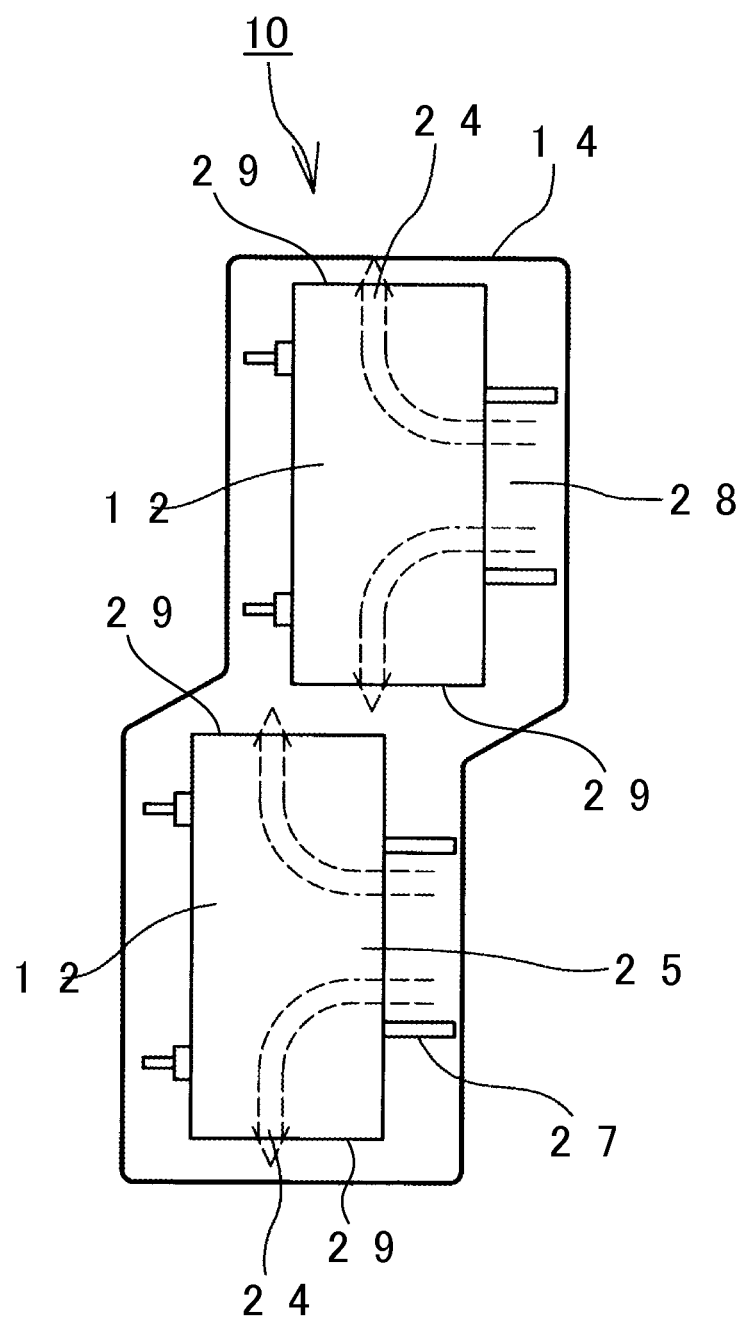
FIG. 6 is a view illustrating an exemplary mounting state of a battery pack.

Further, the above description provides an example in which two cell stacks 12 are arranged in a horizontal direction. However, depending on a state of a mounting space, two cell stacks 12 may be arranged in an up-down direction so that respective upper faces 30 face a lateral side (the vehicle width direction). FIG. 6 is a view illustrating an example in which two cell stacks 12 are placed in the up-down direction. In this case, each of the cell stacks 12 is placed so that its upper face faces a lateral side. The two cell stacks 12 are placed so as to be shifted from each other in an exhaust-surface direction, that is, in the right-left direction, so that their exhaust surfaces are opposed to each other, but so that their exhaust ports 24 do not face each other. However, if a wall surface of a space where the cell stacks 12 are provided does not have any irregularities or the like, just the formation positions of the exhaust ports 24 may be shifted from each other without shifting the mounting positions of the cell stacks 12 from each other, as illustrated in FIG. 5. In any case, the exhaust ports 24 are placed so as not to face each other, so that thermal influence between the cell stacks 12 can be reduced, and eventually, the adjacent distance between the cell stacks 12 can be reduced, thereby making it possible to reduce the size of the battery pack 10.

Note that the above description provides an example in which the number of cell stacks 12 to be accommodated in one battery pack 10 is two, but is not limited thereto, and the number of cell stacks 12 to be accommodated in the battery pack 10 may be two or more. In this case, at least two cell stacks 12 among a plurality of cell stacks 12 may be configured such that their exhaust surfaces are opposed to each other, but their exhaust ports 24 do not face each other, and exhaust ports 24 of the other cell stacks 12 may face each other.

Figure 7:
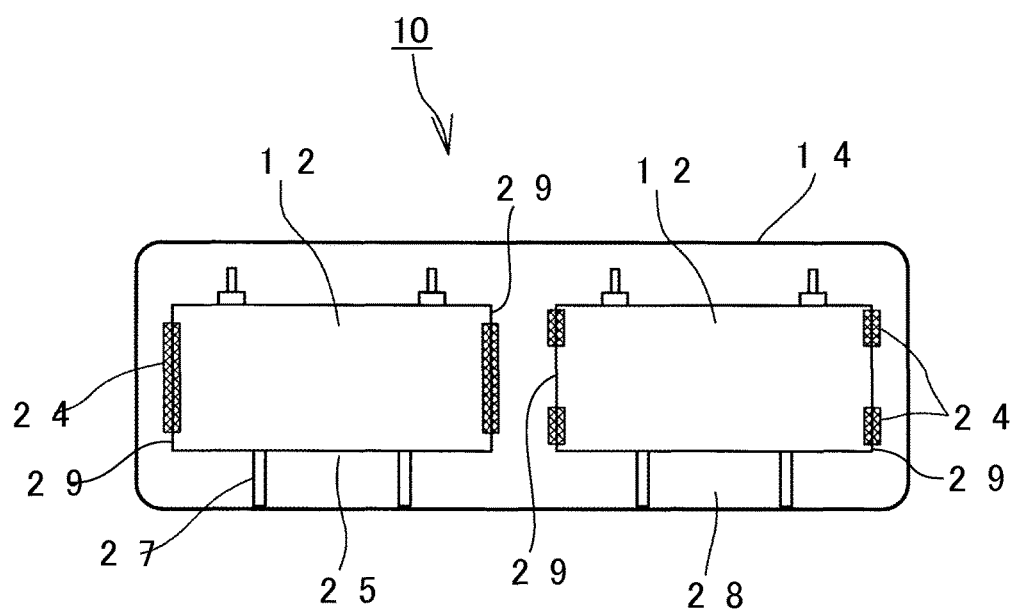
FIG. 7 is a view illustrating an exemplary mounting state of a battery pack.

Further, the cell stacks 12 may have different shapes, and the cell stacks 12 may include respective exhaust ports 24 of different sizes and may include different numbers of exhaust ports 24. For example, as illustrated in FIG. 7, the size and the number of exhaust ports 24 in one cell stack 12 may be different from the size and the number of exhaust ports 24 in the other cell stack 12. Note that, in FIG. 7, a part with cross hatching indicates a range in which the exhaust port 24 is formed. Even in this case, at least part of the exhaust port 24 of the one cell stack 12 is placed so as not to face the exhaust port 24 of the other cell stack 12. Here, that "at least part of an exhaust port of one cell stack does not face an exhaust port of the other cell stack" includes not only a state where a range of the exhaust port 24 of the one cell stack 12 completely deviates from a range of the exhaust port 24 of the other cell stack 12, but also a state where the range of the exhaust port 24 of the one cell stack 12 partially overlaps with the range of the exhaust port 24 of the other cell stack 12, as illustrated in FIG. 7. The range of the exhaust port 24 indicates a region where a diameter of the exhaust port 24 extends outside the cell stack 12 in a direction perpendicular to the exhaust surface 29. In a case where the exhaust port 24 forms a certain angle relative to the exhaust surface 29, the range of the exhaust port 24 may be a region where the diameter of the exhaust port 24 extends in a direction of the angle. That is, the range of the exhaust port 24 of one cell stack 12 is provided so as not to completely overlap with the range of the exhaust port 24 of the other cell stack 12.

What is claimed is:

1. A battery pack for a vehicle, the battery pack comprising:

a first cell stack including a plurality of cells and a first exhaust surface, the first exhaust surface having a first exhaust port from which refrigerant is discharged; and a second cell stack including a plurality of cells and a second exhaust surface, the second exhaust surface having a second exhaust port from which refrigerant is discharged, wherein the first exhaust surface and the second exhaust surface are opposed each other, and at least part of the first exhaust port does not face the second exhaust port, wherein:

the first cell stack is placed on a first surface and the second cell stack is placed on a second surface, wherein the first surface and the second surface are surfaces are part of an internal vehicle space;

the first exhaust surface and the second exhaust surface are parallel to a vehicle height direction;

the first cell stack and the second cell stack are placed adjacent to each other in a horizontal direction; and the first surface is shifted from the second surface in the vehicle height direction.

2. The battery pack according to claim 1, wherein:

the first exhaust port and the second exhaust port are placed in corresponding positions in the first exhaust surface and the second exhaust surface, respectively; and the first cell stack is shifted from the second cell stack in a direction parallel to the first exhaust surface and the second exhaust surface.

3. The battery pack according to claim 2, wherein:
the first surface is shifted from the second surface in the direction parallel to the first exhaust surface and the second exhaust surface.

4. The battery pack according to claim 3, wherein:
the battery pack is provided below a seat or in a luggage space of a vehicle;
the first cell stack is provided on a front side of the vehicle relative to the second cell stack; and
the first surface is placed higher than the second surface in the vehicle height direction.

5. The battery pack according to claim 1, wherein:
the first cell stack and the second cell stack each have an upper face, a bottom face, a front face, a back face, a first side face and a second side face;
the bottom face is opposed to the upper face, the front face and the back face are end surfaces in a cell laminating direction, and the first side face and the second side face are end surfaces in a cell width direction;
the first exhaust port is placed on the first side face, the second exhaust port is placed on the second side face; and
the upper face or the bottom face has an intake port.

* * * * *